United States Patent
Heen et al.

(10) Patent No.: US 10,545,945 B2
(45) Date of Patent: Jan. 28, 2020

(54) CHANGE MONITORING SPANNING GRAPH QUERIES

(71) Applicant: Microsoft Technology Licensing, LLC, Redmond, WA (US)

(72) Inventors: Peter Dahle Heen, Tromsø (NO); Dag Steinnes Eidesen, Tromsø (NO); Amund Kronen Johansen, Tromsø (NO); Dag Brattli, Tromsø (NO); Jan-Ove Almli Karlberg, Tromsø (NO); Tor Kreutzer, Tromsø (NO); Åge Kvalnes, Tromsø (NO); Steffen Viken Valvåg, Tromsø (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 504 days.

(21) Appl. No.: 15/338,290

(22) Filed: Oct. 28, 2016

(65) Prior Publication Data

US 2018/0121482 A1    May 3, 2018

(51) Int. Cl.
| | | |
|---|---|---|
| *G06F 17/30* | (2006.01) | |
| *G06F 16/23* | (2019.01) | |
| *G06F 16/28* | (2019.01) | |
| *G06F 16/901* | (2019.01) | |
| *G06F 16/2457* | (2019.01) | |

(52) U.S. Cl.
CPC ...... *G06F 16/2358* (2019.01); *G06F 16/2393* (2019.01); *G06F 16/24575* (2019.01); *G06F 16/284* (2019.01); *G06F 16/9024* (2019.01)

(58) Field of Classification Search
None
See application file for complete search history.

(56) References Cited

U.S. PATENT DOCUMENTS

| | | |
|---|---|---|
| 6,397,206 B1 | 5/2002 | Hill et al. |
| 6,427,234 B1 | 7/2002 | Chambers et al. |
| 6,556,983 B1 | 4/2003 | Altschuler et al. |

(Continued)

FOREIGN PATENT DOCUMENTS

| | | |
|---|---|---|
| EP | 3016004 A1 | 5/2016 |
| WO | 2011151500 A1 | 12/2011 |

OTHER PUBLICATIONS

"Quotient filter—Wikipedia", Retrieved from <<https://en.wikipedia.org/w/index.php?title=Quotient_filter&oldid=720907087>>, May 18, 2016, 6 Pages.

(Continued)

*Primary Examiner* — Anhtai V Tran
(74) *Attorney, Agent, or Firm* — Merchant & Gould

(57) ABSTRACT

Approximate Membership Query (AMQ) Filters are used in conjunction with graph queries to a relational graph to provide change monitoring that span views associated with the queries. Each node from the relational graph spanned by a graph query and the index structure for the view are added as members to an AMQ filter. When a change is made to the relational graph, the changed nodes are queried against the AMQ filter. When a changed node is noted as a candidate member of the AMQ filter, the graph query may be rerun to update the view associated with the query. Otherwise, the graph query is not rerun, thus saving computing resources and improving the systems hosting and querying the relational graph.

20 Claims, 4 Drawing Sheets

(56) References Cited

U.S. PATENT DOCUMENTS

| | | |
|---|---|---|
| 7,363,299 B2 | 4/2008 | Dalvi et al. |
| 7,424,498 B1 | 9/2008 | Patterson |
| 7,899,861 B2 | 3/2011 | Feblowitz et al. |
| 8,086,598 B1 | 12/2011 | Lamb et al. |
| 8,156,129 B2 | 4/2012 | Zhou et al. |
| 8,321,430 B2 | 11/2012 | Zvi et al. |
| 8,326,847 B2 | 12/2012 | Balmin et al. |
| 8,423,538 B1 | 4/2013 | Sadikov et al. |
| 8,819,078 B2 | 8/2014 | Roy et al. |
| 9,071,533 B2 | 6/2015 | Hui et al. |
| 9,092,481 B2 | 7/2015 | Digana |
| 9,141,727 B2 | 9/2015 | Arikuma et al. |
| 9,158,847 B1 | 10/2015 | Majumdar |
| 9,244,983 B2 | 1/2016 | Yang et al. |
| 9,348,880 B1 | 5/2016 | Ramer et al. |
| 9,367,880 B2 | 6/2016 | Raina et al. |
| 9,378,241 B1 | 6/2016 | Shankar et al. |
| 9,626,407 B2 | 4/2017 | Behal et al. |
| 2005/0175245 A1 | 8/2005 | Sutanto et al. |
| 2006/0064432 A1 | 3/2006 | Pettovello |
| 2007/0174309 A1 | 7/2007 | Pettovello |
| 2007/0282470 A1 | 12/2007 | Hernandez et al. |
| 2008/0243770 A1 | 10/2008 | Aasman |
| 2008/0294615 A1 | 11/2008 | Furuya et al. |
| 2009/0300002 A1 | 12/2009 | Thomas et al. |
| 2010/0036835 A1 | 2/2010 | Stergiou et al. |
| 2010/0211924 A1 | 8/2010 | Begel et al. |
| 2010/0268722 A1 | 10/2010 | Yalamanchi et al. |
| 2011/0246439 A1 | 10/2011 | Isard et al. |
| 2011/0295841 A1 | 12/2011 | Sityon et al. |
| 2011/0296517 A1 | 12/2011 | Grigoriev et al. |
| 2012/0047114 A1 | 2/2012 | Duan et al. |
| 2012/0047149 A1 | 2/2012 | Zhou et al. |
| 2012/0158636 A1 | 6/2012 | Bowers et al. |
| 2012/0303627 A1 | 11/2012 | Keeton et al. |
| 2013/0110876 A1 | 5/2013 | Meijer et al. |
| 2013/0179467 A1 | 7/2013 | Ain |
| 2013/0204903 A1 | 8/2013 | Hao et al. |
| 2013/0232452 A1* | 9/2013 | Krajec .................. G06F 3/0482 715/840 |
| 2013/0246454 A1 | 9/2013 | Menten |
| 2013/0275410 A1 | 10/2013 | Atedgi et al. |
| 2014/0067781 A1 | 3/2014 | Wolchok et al. |
| 2014/0067791 A1 | 3/2014 | Idicula et al. |
| 2014/0068533 A1 | 3/2014 | Goswami et al. |
| 2014/0136520 A1 | 5/2014 | Digana |
| 2014/0136553 A1 | 5/2014 | Jacob et al. |
| 2014/0164347 A1* | 6/2014 | Jeh .................. G06F 16/2358 707/706 |
| 2014/0172914 A1 | 6/2014 | Elnikety et al. |
| 2014/0250047 A1 | 9/2014 | Bounouane et al. |
| 2014/0278590 A1 | 9/2014 | Abbassi et al. |
| 2014/0324864 A1 | 10/2014 | Choe et al. |
| 2014/0330818 A1 | 11/2014 | Raina et al. |
| 2014/0337317 A1 | 11/2014 | Woss et al. |
| 2014/0365503 A1 | 12/2014 | Franceschini et al. |
| 2015/0081741 A1 | 3/2015 | Xu |
| 2015/0106324 A1 | 4/2015 | Puri et al. |
| 2015/0169758 A1 | 6/2015 | Assom et al. |
| 2015/0193636 A1 | 7/2015 | Snelling |
| 2015/0220530 A1 | 8/2015 | Banadaki et al. |
| 2015/0234936 A1 | 8/2015 | Hu et al. |
| 2015/0242402 A1* | 8/2015 | Holm .................. G06F 16/9024 707/733 |
| 2015/0248487 A1 | 9/2015 | Baranowski et al. |
| 2015/0310129 A1 | 10/2015 | Ushijima |
| 2015/0317360 A1 | 11/2015 | Ngai et al. |
| 2015/0324410 A1 | 11/2015 | Glover |
| 2015/0363461 A1* | 12/2015 | Behal .................. G06F 16/24534 707/722 |
| 2015/0363705 A1 | 12/2015 | Moore et al. |
| 2015/0370919 A1 | 12/2015 | Bomhoevd et al. |
| 2016/0034462 A1 | 2/2016 | Brewer |
| 2016/0055311 A1 | 2/2016 | Buchanan et al. |
| 2016/0063017 A1 | 3/2016 | Bartlett et al. |
| 2016/0092350 A1 | 3/2016 | Rajanna et al. |
| 2016/0110134 A1 | 4/2016 | Rao et al. |
| 2016/0117358 A1 | 4/2016 | Schmid et al. |
| 2016/0148093 A1 | 5/2016 | Adderly et al. |
| 2016/0189218 A1 | 6/2016 | Kota |
| 2016/0203327 A1 | 7/2016 | Akkiraju et al. |
| 2017/0206276 A1 | 7/2017 | Gill |
| 2017/0364539 A1 | 12/2017 | Jacob et al. |
| 2018/0039696 A1 | 2/2018 | Zhai et al. |
| 2018/0053327 A1 | 2/2018 | Contractor et al. |
| 2018/0096035 A1 | 4/2018 | Kreutzer et al. |
| 2018/0113950 A1 | 4/2018 | Blanchflower |
| 2018/0173727 A1 | 6/2018 | Kreutzer et al. |
| 2018/0173760 A1 | 6/2018 | Viken valvag et al. |
| 2018/0247073 A1 | 8/2018 | Kreutzer et al. |
| 2019/0171840 A1 | 6/2019 | Kreutzer et al. |

OTHER PUBLICATIONS

"International Search Report and Written Opinion Issued in PCT Application No. PCT/US2017/057775", dated Jan. 23, 2018, 13 Pages.

"Non Final Office Action Issued in U.S. Appl. No. 15/399,975", dated Dec. 19, 2018, 11 Pages.

"Non Final Office Action Issued in U.S. Appl. No. 15/399,989", dated Jan. 8, 2019, 19 Pages.

"Final Office Action Issued in U.S. Appl. No. 15/282,718", dated Mar. 11, 2019, 13 Pages.

Zervakis, et al., "Towards Publish/Subscribe Functionality on Graphs", In Proceedings of the Workshops of the EDBT/ICDT Joint Conference, Mar. 15, 2016, 4 pages.

Hassan, et al., "Graph Indexing for Shortest-Path Finding over Dynamic Sub-Graphs", In Proceedings of the International Conference on Management of Data, Jun. 26, 2016, pp. 1183-1197.

"Getting started with IBM Graph", Retrieved on: Aug. 9, 2016 Available at: https://ibm-graph-docs.ng.bluemix.net/gettingstarted.html.

"Non Final Office Action Issued in U.S. Appl. No. 15/282,718", dated Oct. 9, 2018, 16 Pages.

Cheng, et al., "Fast Graph Query Processing with a Low-Cost Index", In the Very Large Data Bases Journal, vol. 20, Issue 4, Aug. 2011, pp. 521-539.

Fan, et al., "Cuckoo Filter", Retrieved From: https://github.com/efficient/cuckoofilter, Jan. 15, 2016, 2 Pages.

Fard, et al., "Effective Caching Techniques for Accelerating Pattern Matching Queries", In Proceedings of the IEEE International Conference on Big Data, Oct. 27, 2014, pp. 491-499.

Gai, et al., "An Efficient Summary Graph Driven Method for RDF Query Processing", Retrieved From: https://arxiv.org/pdf/1510.07749.pdf, Oct. 17, 2016, 12 Pages.

Gomes-Jr, et al., "Beta-Algebra: Towards a Relational Algebra for Graph Analysis", In Proceedings of the Workshops of the EDBT/ICDT 2015 Joint Conference, Mar. 27, 2015, pp. 157-162.

Gomes-Jr, et al., "Querying and Managing Complex Data", In Proceedings of the 18th East European Conference on Advances in Databases and Information Systems and Associated Satellite Events, Sep. 7, 2014, pp. 317-321.

Gomes-Jr, et al., "Towards Query Model Integration: Topology-Aware, IR-Inspired Metrics for Declarative Graph Querying", In Proceedings of the Joint 2013 EDBT/ICDT Conferences, Mar. 22, 2013, pp. 185-194.

Hintsanen, et al., "Finding Reliable Subgraphs from Large Probabilistic Graphs", In Journal of Data Mining and Knowledge Discovery, vol. 17, Issue 1, Aug. 2008, pp. 3-23.

Hunger, Michael, "Querying Graphs with Neo4j", Retrieved From: https://dzone.com/refcardz/querying-graphs-neo4j, Nov. 6, 2015, 26 Pages.

Jindal, et al., "GRAPHiQL: A Graph Intuitive Query Language for Relational Databases", In Proceedings of IEEE International Conference on Big Data, Oct. 27, 2014, pp. 441-450.

Kim, et al., "Retrieving Keyworded Subgraphs with Graph Ranking Score", In Journal of Expert Systems with Applications, vol. 39, Issue 5, Apr. 2012, pp. 4647-4656.

(56) References Cited

OTHER PUBLICATIONS

Liptchinsky, et al., "Expressive Languages for Selecting Groups from Graph-Structured Data", In Proceedings of the 22nd International World Wide Web Conference, May 13, 2013, pp. 761-770.
Niu, Yin, "Introduction to Probabilistic Data Structures", Retrieved From: https://dzone.com/articles/introduction-probabilistic-0, Apr. 30, 2015, 26 Pages.
Papailiou, et al., "Graph-Aware, Workload-Adaptive SPARQL Query Caching", In the Proceedings of the ACM SIGMOD International Conference on Management of Data, May 31, 2015, pp. 1777-1792.
"International Search Report and Written Opinion Issued in PCT Application No. PCT/US2017/053856", dated Nov. 23, 2017, 12 Pages.
"International Search Report and Written Opinion Issued in PCT Application No. PCT/US2017/065214", dated Feb. 8, 2018, 12 Pages.
"International Search Report and Written Opinion Issued in PCT Application No. PCT/US2018/019072", dated Jul. 10, 2018, 22 Pages.
Rest, et al., "PGQL: A Property Graph Query Language", In Proceedings of the Fourth International Workshop on Graph Data Management Experience and Systems, Jun. 24, 2016, 6 Pages.
Shao, et al., "Trinity", Retrieved From: https://www.microsoft.com/en-us/research/project/trinity/, Oct. 30, 2010, 6 Pages.
Wood, Peter T., "Query Languages for Graph Databases", In Journal of SIGMOD Record, vol. 41, Issue 1, Mar. 2012, pp. 50-60.
"Notice of Allowance Issued in U.S. Appl. No. 15/399,989", dated Jun. 12, 2019, 12 Pages.
"Notice of Allowance Issued in U.S. Appl. No. 15/399,975", dated Apr. 17, 2019, 12 Pages.
"Non Final Office Action Issued in U.S. Appl. No. 16/268,783", dated Date: Sep. 27, 2019, 14 Pages.

* cited by examiner

CHANGE MONITORING SPANNING GRAPH QUERIES

BACKGROUND

In a graph database, entities are presented as nodes and relationships between those entities are presented as edges in a view of the relational graph maintained by the graph database. The relational graph may be periodically queried by users via graph queries to learn about the relationships between entities. For example, a user may issue a graph query to find friends or contacts within a social network, the documents that a given user has interacted with, the users that a given document has been accessed by, the entities that satisfy various search criteria, etc. As will be appreciated, the relational graph changes as data are added, changed, and removed, and the results of the graph queries may change as a result. Graph queries, however, are computationally expensive to run and therefore keeping the results of graph queries up-to-date in light of changes to the underlying relational graph may require computing devices accessing or hosting the graph database to expend significant processing or storage resources to run repeated graph queries or to run change monitors on every node.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Computationally less intensive methods for monitoring changes to a relationship graph, and systems that employ said methods, are provided herein. Instead of rerunning graph queries periodically or monitoring individual nodes for changes thereto, which may miss the addition of new nodes, a stream of changes to the relationship graph is provided for comparison to one or more Approximate Member Query (AMQ) filters. The stream of changes includes identifiers for nodes affected by a change to a node, identifiers for the nodes connected to an edge affected by a change, and/or a search index tree or other identifier for the set of nodes comprising all or a portion of the relationship graph.

The AMQ filters are constructed from the set of node identifiers for nodes that satisfied or were considered for already-run graph queries that are to be monitored. AMQ filters (which include, but are not limited to, Bloom filters, cuckoo filters, and quotient filters), provide a probabilistic check for whether an element is a member of a set that provides no false negatives; for a given comparison the filter returns results of "potentially in the set" or "not in the set". When a result of "not in the set" is returned, it is determined that the change has not affected the results of the graph query. When a result of "potentially in the set" is returned, the graph query may be re-run and compared to the previous run to determine if a change has occurred, in which case the change may be exposed to the querying user. In addition to the ability to prevent the unnecessary re-running of graph queries, AMQ filters provide the ability to reduce the amount of data needed to be stored in computer memory, the ability to detect additions/deletions of nodes as potential changes to a graph query, and improve the speed at which it is decided to re-run the graph query.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
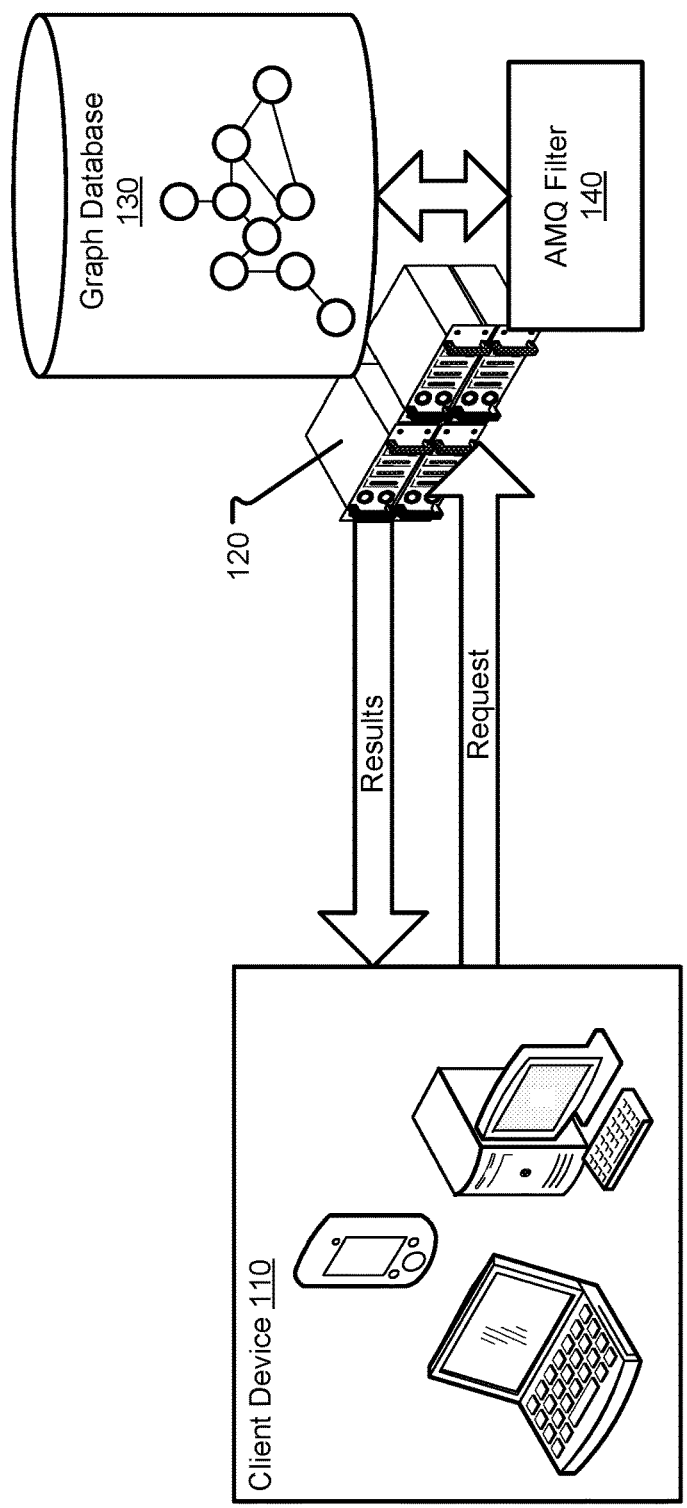
FIG. 1 illustrates an example environment in which the present disclosure may be practiced.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Computationally less intensive methods for monitoring changes to a relationship graph, and systems that employ said methods, are provided herein. Approximate Membership Query (AMQ) Filters are used in conjunction with graph queries to a relational graph to provide change monitoring that span views associated with the queries. Each node from the relational graph spanned by a graph query and the index structure for the view are added as members to an AMQ filter. When a change is made to the relational graph, the changed nodes are queried against the AMQ filter. When a changed node is noted as a candidate member of the AMQ filter, the graph query may be rerun to update the view associated with the query. Otherwise, the graph query is not rerun, thus saving computing resources and improving the systems hosting and querying the relational graph among other benefits provided by AMQ filters, including improved memory storage space requirements.

FIG. 1 illustrates an example environment 100 in which the present disclosure may be practiced. A client device 110 is in communication with a graph server 120, which maintains a relational graph in a graph database 130. A relational graph maintains several entities as nodes and the relationships between those nodes as edges connecting related nodes, and the graph database 130 is operable to store one or more relational graphs and subgraphs thereof for the client device 110 to query. The graph server 120 also maintains one or more AMQ Filters 140 (Approximate Membership Query filters) associated with previously-run queries to reduce the number of calls to rerun those queries on the graph database 130.

Each of the client device 110 and graph server 120 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 3 and 4. Client devices 110 are operated by users, who may be humans or automated systems (e.g., "bots"). In various aspects, the client device 110, and graph server 120 may be accessed by a user or each other locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link).

The graph server 120 hosts a graph database 130 of a relational graph with nodes describing entities and a set of accompanying properties of those entities, such as, for example, the names, titles, ages, addresses, etc. Each property can be considered a key/value pair—a name of the property and its value. In other examples, entities represented as nodes that include documents, meetings, communication, etc., as well as edges representing relations among these entities, such as, for example, an edge between a person node and a document node representing that person's authorship, modification, or viewing of the document.

The graph server 120 executes graph queries that are submitted by various users. The graph server 120 is also operable to access the graph structure description, which resides in the graph database 130, which may include, in various aspects: a relational database, a NoSQL database, or any other database. Subgraphs or views of the relational graph are stored in the graph database 130 for later analysis or subsequent graph queries for the same metrics in various aspects. In some aspects, when the graph server 120 produces a subgraph in response to a graph query, the graph server 120 checks whether a subgraph that will satisfy the graph query exists in the graph database 130, and will produce that subgraph by retrieving it from the graph database 130, otherwise the graph server 120 will produce the subgraph by executing the graph query, and may optionally store the resulting subgraph for later retrieval.

A graph query requested by a client device 110 spans the current state of the graph structure, but as the graph database 130 is updated or changed, the results of various queries to the relational graph (or a subgraph thereof) may be affected or unaffected by that update. For example, a query to the graph for documents trending around a given person may be affected when the given person creates a new document, but remains unaffected when a different person creates a new document or a node representing a new person is added to the graph structure. The users who submitted those queries, in turn, may be interested or uninterested in changes to the graph database 130 that affect their queries. For example, a user who desires a "snapshot" view of the graph database 130 (e.g., the view at time t) may be uninterested in any updates that would affect the query at a later time. In another example, a user who desires a "live" view of the graph database 130 is interested in every update that would affect the query. In a further example, a use who desires a "periodic" view of the graph database 130 is interested in some updates to the graph database 130 that affect the query, but not all updates (e.g., wait at least m minutes from the last update before being interested in another update, wait for at least n changes to the graph).

As will be appreciated, rerunning graph queries is computationally expensive, and when the graph query is rerun without a change affecting the view that the query spans, the functionality of the machine rerunning the graph queries would have been improved if those processing resources were not spent on rerunning the graph queries (e.g., used on a different task or reserved). To reduce the number of queries rerun with no resulting changes to the associated view, the graph server 120 may only update after a threshold is reached, which may increase the odds that a relevant change has occurred. For example, one or more queries may be rerun in response to n updates to the relational graph, after x amount of data or nodes are added to the relational graph, or after t time since the last rerun. These approaches can improve the odds that a relevant change has been made, but still result in all of the graph queries meeting the rerun requirements being run again without regard to whether a relevant change has occurred.

Similarly, focusing the rerun requirements to particular subgraphs may reduce the number of queries that need to be rerun, but discovering which subgraphs are affected requires additional computational resources and storage overhead. Additionally, tracking changes to the composition of the subgraph by comparing subgraphs to prior query results makes tracking individual subgraphs inefficient as the nodes and edges included as results of a query may change. For example, with a query of a social network relational graph for the "friends" of a given person, if new "friends" are added, a new view would include additional nodes for persons considered friends with the given person compared to an older view. In a similar example, with a query of a social network relational graph for the "friends" of a given person, if some persons are removed as "friends," a new view would include fewer nodes for persons considered friends with the given person compared to an older view.

To reduce the amount of computational resources expended on rerunning graph queries unaffected by changes made to the graph database 130, the graph server 120 maintains one or more AMQ filters 140 (Approximate Membership Query filters) instead of or in addition to the thresholds and collated sets described above. The graph server 120 is operable to associate an AMQ filter 140 with a query's view of the relational graph so that the AMQ filter 140 will indicate when the view is unchanged, and rerunning the query is unnecessary.

Each node in the graph database 130 is associated with a unique identifier, and the collection of nodes that are part of a view responsive to a query are considered to be part of the set managed by the associated AMQ filter 140. In some aspects, nodes that were considered, but rejected by the query, are also included in the AMQ filter's 140 member set. In further aspects, the index structure of the nodes in the view is treated as a member of the AMQ filter's 140 member set or is stored separately, but in association with the AMQ filter 140. An index structure is constructed by concatenating the identifiers of the nodes in a flattened tree structure. In response to a node being updated, added, or removed in the graph database 130, the graph server 120 is operable to query one or more AMQ filters 140 to determine whether the affected node is part of those AMQ filters' 140 member sets. In various aspects, the identifiers of the nodes affected by a change are fed to the graph server 120 as a change stream, to compare against one or more AMQ filters 140.

For example, when a list of documents most recently associated with a user is requested by a query that returns a view of Nodes A, B, and C (associated with Documents A, B, and C that are recently associated with the user), those nodes are made part of the AMQ filter's 140 member set. When a user accesses a Document$_D$, Node$_D$ (associated with Document$_D$) is added to the graph database 130 (or an edge is created between Node$_D$ and the user's node), and the graph server 120 is operable to check the AMQ filter 140 as to whether Node$_D$ is potentially a part of its member set. When the AMQ filter 140 returns a negative response (e.g., indicating that Node$_D$ is not a potential part of its member set), the graph server 120 will not rerun the associated query. When the AMQ filter 140 returns a positive response (e.g., indicating that Node$_D$ is a potential part of its member set), the graph server 120 may rerun the associated query or indicate to the user that a potential change to the prior view provided by the graph query exists.

The AMQ filter 140 may provide true positives, true negatives, or false positives, but not false negatives as results to queries of its membership set; the results state that a candidate member is either "definitely not in the set" or "probably in the set." By providing a results set without false negatives, the graph server 120 can be sure that any negative result it receives is correct, and the number of calls to the graph database 130 can therefore be reduced, thus improving the functionality of the graph server 120.

As will be appreciated, however, positive results (true or false) of "probably in the set" can result in the graph server 120 calling the graph database 130 and rerunning the query or asking a user to authorize rerunning the query. False positive results lead to a query being run without an associated change in the query's view. The incidence of false positives ("probably not in the set" when not in the set) may be adjusted by the graph server 120 by adjusting the size of the AMQ filter 140, where a larger AMQ filter 140 (using more bits for a given number of nodes whose membership is tracked) results in a lower incidence of false positive results. One of ordinary skill in the art will be able to select an appropriate size to use for the AMQ filters 140 to balance storage space needs for the AMQ filters 140 and the computational resources expended on rerunning unnecessary queries due to false positives. In various aspects, the size selected for the AMQ filter 140 is chosen based on a number of entities (nodes) in the corresponding view and a desired false positive rate, and the AMQ filter 140 may remain static or be dynamic in size as entities are added to or removed from the membership set. In some aspects, the size of the AMQ filter 140 is constant, which provides administrators with predictable storage needs as more queries are submitted to the graph server 120.

The AMQ filter 140 provides an array of bits in which hashes of its member set are stored. Various hashing algorithms may be used to record a node's membership in an AMQ filter 140. A hashing algorithm (also referred to as a "hash function") yields a one-way encryption of data (referred to as a hash), which may be achieved according to various algorithms known to those of ordinary skill in the art (SHA-2, SHA256, MD5, BLAKE2, Keccak, GOST, etc.). In various aspects, the AMQ filters 140 are Bloom filters, cuckoo filters, quotient filters, or another probabilistic filter, which provides the graph server 120 a structure to test whether node is a candidate member of a set.

The AMQ filter 140 hashes the identifier of the node that is a member of its set by one or more hash functions (or initializations of the same hash function) to determine a position in the array (e.g., the bits at position$_a$ for hash$_1$, position$_b$ for hash$_2$, and position$_c$ for hash$_3$). The bit at the designated position in the array is then set to one/TRUE to record the node as a member of the set monitored by the AMQ filter 140. The array of the AMQ filter 140 is initially set so that all of its bits are set to zero/FALSE, and as elements are added to the member set, the bits designated by the hash functions are set to one/TRUE. If a hash function designates a position in the array for which the bit is already set to one/TRUE, that bit will remain set to one/TRUE, which provides 100% recall for the AMQ filter 140.

When reading from the AMQ filter 140 to determine whether a node is part of the member set recorded in the array, the identifier of the candidate node is hashed as though it were being added to the array, and the positions generated for the candidate node (i.e., candidate positions) are bitwise-logically examined against the array. If all of the positions generated for the candidate node have values in the array of one/TRUE, the AMQ filter 140 returns a positive result (e.g., "probably in the set"). If one or more of the positions generated from the candidate node have values in the array of zero/FALSE, the AMQ filter 140 returns a negative result (e.g., "definitely not in the set"). As will be appreciated, the meaning assigned to the values of the bits may be reversed in another aspect (e.g., initialization with zero/TRUE and indicating membership with one/FALSE, etc.) without departing from the spirit of the present disclosure; the AMQ filter 140 is operable to track membership via a second state from a baseline first state according to various conventions.

For example, consider the member set of Node$_A$, Node$_B$, and Node$_C$, which are recorded into an AMQ filters 140 using three hash functions and an ordered array of thirty-two bits (positions). The identifier for each of the nodes is hashed according to each of the hash functions, yielding nine positions in the array (although not all nine positions may be unique). For example, node$_A$ may be mapped to positions 1, 7, and 26; node$_B$ to positions 5, 30, and 31; and node$_C$ to positions 5, 12, and 26; yielding nine positions (seven unique) in the array. The bits in the array at each of the positions (1, 5, 7, 12, 26, 30, and 31) are set to one/TRUE (the second state) and at all other positions the bits remain set to zero/FALSE (the first state). When a user checks whether Node$_D$ is a member of the AMQ filter 140, Node$_D$ is hashed according to each of the hash functions, yielding three candidate positions in the array—at positions 1, 5, and 23 in the present example. The values of the bits in the array at positions 1, 5, and 23 are one/TRUE, one/TRUE, and zero/FALSE respectively, and because at least one position's value is zero/FALSE (the first state), the AMQ filter 140 will return a negative response indicating that Node$_D$ is not part of the member set. In another example, when a user checks whether Node$_E$ is a member of the AMQ filter 140, Node$_E$ is hashed according to each of the hash functions, yielding three candidate positions in the array—at positions 7, 12, and 30 in the present example. The values of the bits in the array at positions 7, 12, and 30 are all one/TRUE (the second state), and the AMQ filter 140 will return a positive response (albeit a false positive) indicating that $Node_E$ is potentially a member of the set.

Figure 2:
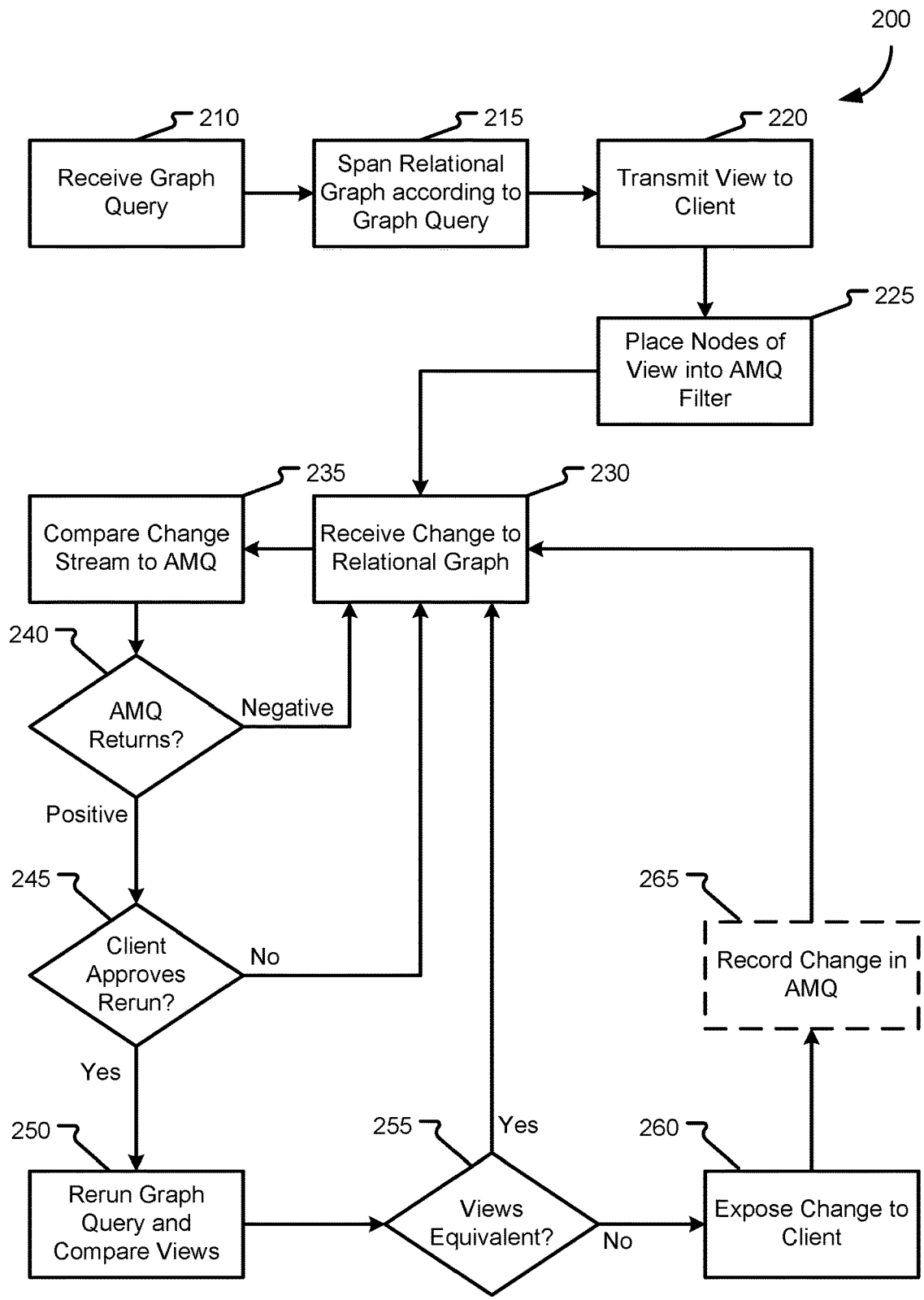
FIG. 2 is a flow chart showing general stages involved in an example method for improving computational efficiency of a graph server tasked to keep graph queries up to date.

FIG. 2 is a flow chart showing general stages involved in an example method 200 for improving computational efficiency of a graph server 120 tasked to keep graph queries up to date. Method 200 enables a graph server 120 to discover when a node or a graph tree of a previously made graph query has potentially changed, and to rerun that graph query to provide up-to-date results or alert a user that a potential change exists for a previously submitted query. Stated differently, method 200 enables the graph server 120 to avoid rerunning graph queries when a change is discovered to have not affected a node or a graph tree.

Method 200 begins at OPERATION 210, where a graph query is received by the graph server 120. In various aspects, graph queries are made from the client device 110 due to various user actions. In one example, hovering a mouse pointer over a user interface element that displays documents having a certain property initiates a graph query to populate that element with links to those documents. In a second example, submitting a request via a search engine or a personal digital assistant (e.g., SIRI®, provided by Apple, Inc. or CORTANA®, provided by Microsoft Corp.) initiates a graph query to respond to that request.

In response to receiving the graph query, the graph server 120 spans the relational graph at OPERATION 215 to produce one or more views or subgraphs for the graph database 130. For example, a graph query may request a list of all of the persons in an organization having a given title, who have been in the organization for at least m months, who have been on a project with a given person, who have access rights to a given file/directory, etc. In another example, a relational graph may be queried for a shortest route to a given destination from a starting location to return a series of streets. In a further example, a relational graph including nodes for persons and for documents, may be queried for the n documents that a user has most frequently interacted with over the last d days. When the graph database 130 is spanned, an index structure is created for the view that identifies the nodes spanned and their relationships amongst one another.

At OPERATION 220, the view returned by the graph query is transmitted to the requesting client by the graph server 120. In various aspects, the view is returned as a list (e.g., the names and links to documents meeting the graph query's arguments) in various formats or as a subgraph (e.g., a reduced size version of the queried relational graph). The client device 110 may perform additional queries, analytics, and formatting operations on the returned view or subgraph to display the relevant data to the client in a desired user interface.

Proceeding to OPERATION 225, the nodes that are part of the returned view/subgraph are added to an AMQ filter 140 associated with the graph query. When the graph query is first submitted, an AMQ filter 140 is created and associated with the graph query. When the graph query is resubmitted (or re-requested to be run) the AMQ filter 140 that was created and associated with the AMQ filter 140 is re-selected and has the nodes part of the re-run graph query added to the AMQ filter 140. In various aspects, when an AMQ filter 140 has its associated query re-run, the nodes returned by the re-run query may be recorded in addition to the existing nodes recorded in the array of the AMQ filter 140, or the AMQ filter 140 may be reset (e.g., the values of the array set back to zero/FALSE) to have the re-run results stored in the AMQ filter 140 without prior results affecting the array.

Additionally, the client, at query time or later, may specify whether the client is interested in receiving updates to the view or subgraph as changes are made, and at what frequency. In aspects where the client has indicated the query is to be a "snapshot" or "static" view (i.e., the client is not interested in receiving updates to the view), method 200 may end without creating an AMQ filter 140 for the query to track potential changes. In other aspects, an AMQ filter 140 is created for the query regardless of the client's currently stated interest in receiving updates so that the client may be alerted to potential changes and thereby indicate interest in receiving the potentially changed view/subgraph.

The AMQ filter 140 includes k hash functions (e.g., one hashing algorithm initialized with k keys) and a membership array of m bits. In various aspects, the identifiers for each node that is part of the view, the identifiers for the nodes that were considered as potentially part of the view, the identifiers for nodes connected by an edge to a node part of or considered as potentially part of the view, and/or an index structure are selected for membership in the AMQ filter 140. The selected identifiers are fed to each of the hash functions, which return a position in the membership array. The bit at each of the returned positons is set to indicate membership (e.g., setting the bit to one/TRUE), and any overlapping/repeated positions results in the bit remaining set to one/TRUE.

The index structure of the view or subgraph spanned by the query in some aspects is recorded in association with the AMQ filter 140. The relational graph is spanned in a tree structure; a root node from which other leaf nodes depend is spanned outwardly from by the graph server 120 along the edges, which act as branches from one node to the next. The identifiers of each of the nodes in the view are collected according to the tree structure, and the structure collapsed, such as, for example, concatenating the tree structure to create a flattened index structure and hashing it to produce a standardized size. Recording the index structure allows for changes to the view to be tracked, such as, for example, the addition of a new node to the view, which was not part of the original member set of the AMQ filter 140, but potentially affects the view returned by the query.

In one example, an index structure allows the AMQ filter 140 associated with discovering "friends" of a given individual in a social network to discover when an additional friend has been added to the individual's social network. The new friend's node in this example is not a member of the AMQ filter 140, but its addition to the relational graph will affect the tree structure of the view or subgraph; causing a mutation in the index structure.

OPERATIONS 210, 215, 220, and 225 are run to initialize an AMQ filter 140 for an associated query. After an AMQ filter 140 is initialized for an associated query, method 200 will wait for a change to be received that affects the relational graph to which the query was addressed. As will be appreciated, one change may affect multiple AMQ filters 140, and although method 200 is generally discussed in relation to a single AMQ filter 140, multiple AMQ filters 140 may be operated on in series or in parallel in response to a change to the relational graph.

At OPERATION 230 a change is received to the relational graph. In various aspects, a change constitutes the addition or removal of a node; the addition, removal, or modification to a property of a node; or a strengthening, weakening, creation, or breaking of an edge between one or more nodes.

For example, when an employee is promoted to manage other employees, the relational graph for the organization to which the employee belongs may be changed by adding a manager property to the node representing the employee and creating edges between the employee and direct reports to the employee (among other changes to represent the promotion). Each change to the graph database 130 is parsed to determine the nodes affected (either directly or via the edges to those nodes) and the identifiers of those nodes are organized to form a change stream.

A change stream includes the individual identifiers of nodes affected by a change to the graph database 130, and in some aspects includes changes or mutations to the index structure of the subgraph or view of a query. The change stream may represent a single change, or batch several changes received over a period of time or affecting at least a threshold number of nodes. In various aspects, the index structure is a tree-based structure originating from a root node, where the span originated, and including the other nodes responsive to the graph query as leaf nodes. The index may be constructed by concatenating the identifiers of the nodes according to the tree structure (e.g., flattening the tree), and condensing (e.g., via one or more hash function operations) the resulting index structure.

At OPERATION 235 the change stream is compared against the AMQ filter 140. The change stream contains identifiers of the nodes or index structures affected by a change, and the AMQ filter 140 is queried to determine whether that identifier appears to be a member of the set recorded in the AMQ filter 140. An identifier received from the change stream is hashed, as though it were being added to the member set of the AMQ filter 140, to produce several positions in the array at which the corresponding node or index structures would be recorded. If each of the positions already indicates that it has been recorded to, the AMQ filter 140 returns a positive result, indicating that the node or index structure associated with the identifier is a candidate for being a member of the set recorded in the AMQ filter 140. If at least one of the positions in the array indicates that it has not been recorded to, the AMQ filter 140 returns a negative result, indicating that the node or index structure associated with the identifier is not a member of the set recorded in the AMQ filter 140.

DECISION 240 directs the flow of method 200 depending on the responses from AMQ filter 140 in OPERATION 235. As discussed above, the AMQ filter 140 responds to the query with either "probably in the set" (a true positive or false positive response) or "definitely not in the set" (a true negative response). When a positive response is returned, method 200 proceeds to DECISION 245. When a negative response is returned, method 200 returns to OPERATION 230 to wait for the next change to the relational graph.

At DECISION 245, it is determined whether the client approves of rerunning the graph query. In various aspects, the client's approval may be sought by transmitting a request to the client device 110 indicating that there is a potential update available for the client's query. In additional aspects, the client may set rerun approval rules for when to automatically approve of rerunning the query or for when to seek the client's permission via an alert. For example, the client may set a threshold of the number of identifiers that return positive results, a rule to ignore potential updates unless the index structure has also changed, a minimum time between updates/alerts, whether the client desires a static view, a threshold time period between the last view produced and the change that the client is interested in, etc. When it is determined that the client approves of rerunning the graph query, method 200 proceeds to OPERATION 250. When it is determined that the client does not approve of rerunning the graph query, method 200 may wait until the client does approve of rerunning the graph query (e.g., to satisfy a time threshold or receive a response to an alert transmitted to the client device) and may return to OPERATION 230 in response to receiving a new change to the relational graph.

At OPERATION 250 the graph query is run again and the view produced by the rerun graph query is compared to the view produced by the previous run of the graph query. It is determined at DECISION 255 whether the views are equivalent. In various aspects, the index structures of each view are compared to each other to determine whether the index structures are the same, wherein if the indexes are the same, it is determined that the views are equivalent. For example, if the AMQ filter 140 returned a false positive, and the node indicated in the change stream is not actually part of the member set of the AMQ filter 140, the index of the nodes in the view for the two runnings of the graph query will be the same.

In another example, if the AMQ filter 140 returned a true positive, and the node indicated in the change stream is part of the member set of the AMQ filter 140, but the change is insufficient to change the index structure, the views are considered equivalent. For example, for a query of the ten most viewed documents by a given user, if the change swaps the order of the eleventh-most and twelfth-most viewed documents, the nodes may be positively identified as part of the member set of the AMQ filter 140, but the view of the top ten documents will remain unaffected; the views are considered equivalent. Similarly in another example of a query of the ten most view documents by a given user, if the change affects a property of the fifth-most viewed document, but does not change the order of the documents in the top ten, the view of the top ten documents will remain unaffected, and the views are considered equivalent.

In response to determining that the rerun view and the prior view are equivalent, method 200 returns to OPERATION 230 to await the next change in the relational graph. In response to determining that the rerun view and the prior view are not equivalent, method 200 proceeds to OPERATION 260 to expose the change to the client. In various aspects, the change is exposed to the client by transmitting the newest view to the client. In other aspects, the change is exposed to the client by transmitting a change notification to the client device 110. The client may respond to the change notification and request the graph server 120 to transmit the newest view to a receiving device, or respond with an "ignore" or "dismiss" command (or not respond) to proceed without receiving the newest view.

Method 200 then optionally proceeds to OPERATION 265 to update the membership of the AMQ filter 140. In some aspects, because the AMQ filter 140 has perfect recall and members cannot be dropped from the array of the AMQ filter 140, the AMQ filter 140 is reinitialized and the current member set is recorded to the array as in OPERATION 210, 215, 220, and 225. In other aspects, when the change indicates that a new member has been added to the view or subgraph, that member is added to the array, and any changes that modify or remove members from the array are ignored.

Method 200 then returns to OPERATION 230 to wait for the next change to be made to the relationship graph.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 3:
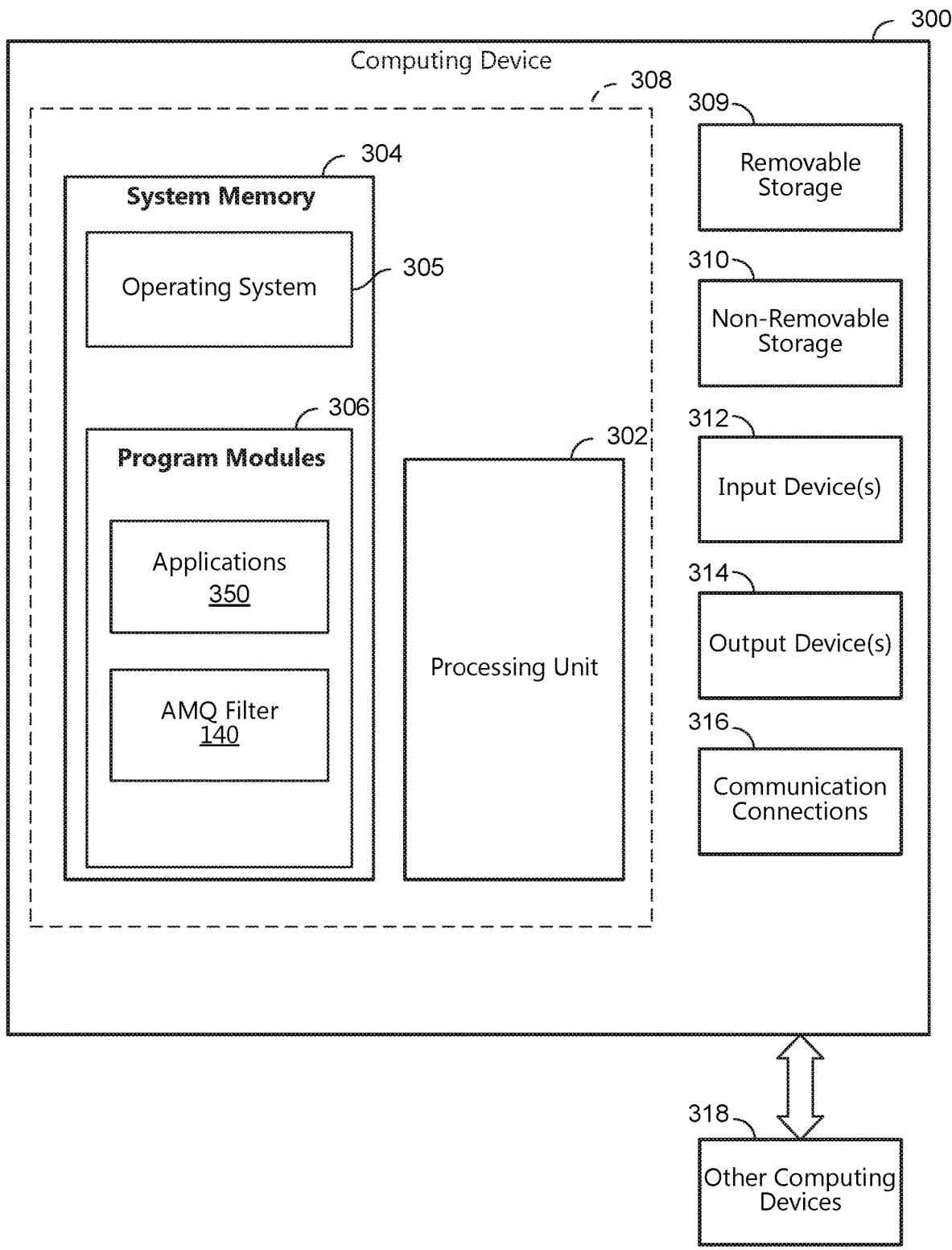
FIG. 3 is a block diagram illustrating example physical components of a computing device.
Figure 4:
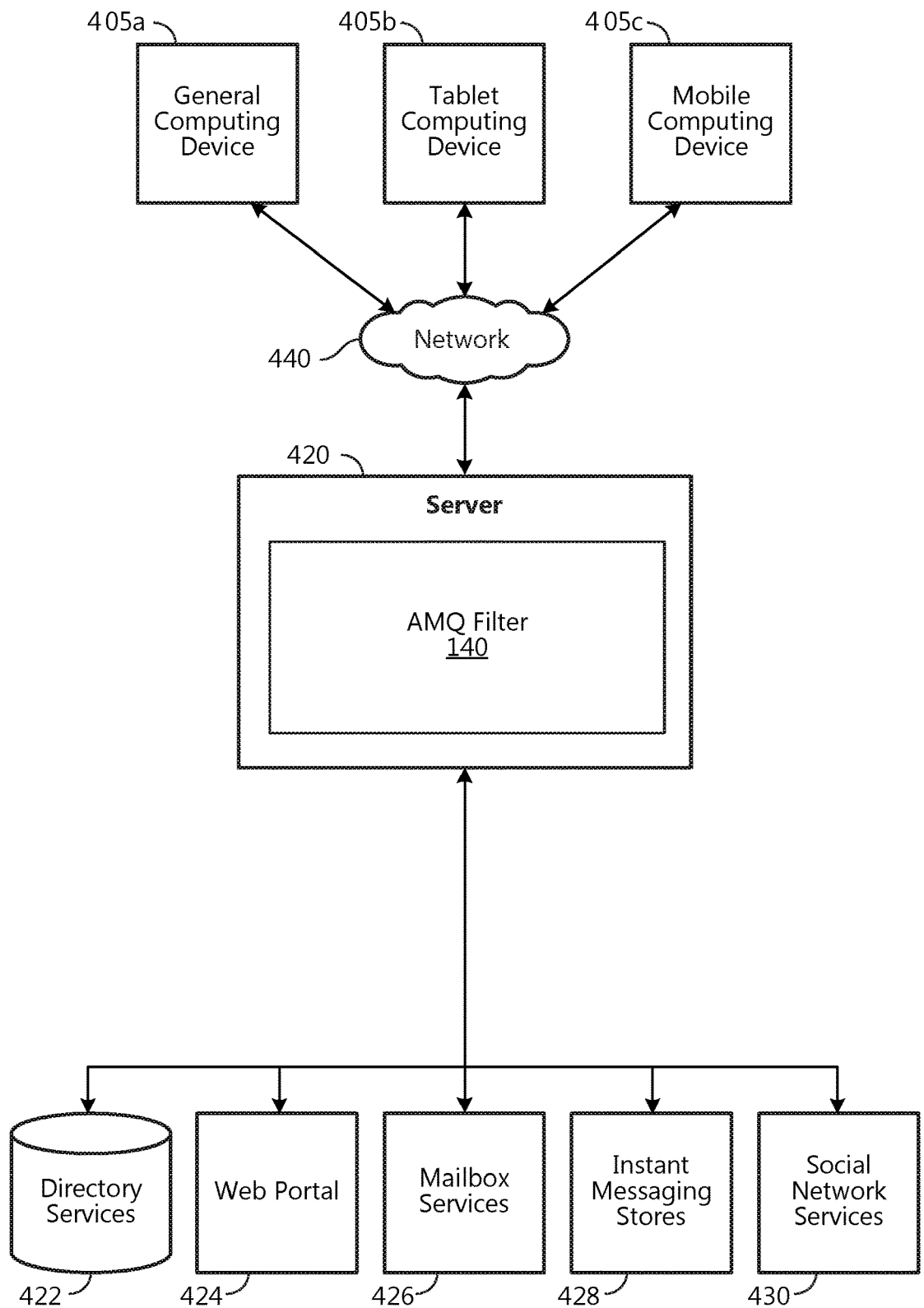
FIG. 4 is a block diagram of a distributed computing system.

FIGS. 3 and 4 and the associated descriptions provide a discussion of a variety of operating environments in which examples are practiced. However, the devices and systems illustrated and discussed with respect to FIGS. 3 and 4 are for purposes of example and illustration and are not limiting of a vast number of computing device configurations that are utilized for practicing aspects, described herein.

FIG. 3 is a block diagram illustrating physical components (i.e., hardware) of a computing device 300 with which examples of the present disclosure may be practiced. In a basic configuration, the computing device 300 includes at least one processing unit 302 and a system memory 304. According to an aspect, depending on the configuration and type of computing device, the system memory 304 comprises, but is not limited to, volatile storage (e.g., random access memory), non-volatile storage (e.g., read-only memory), flash memory, or any combination of such memories. According to an aspect, the system memory 304 includes an operating system 305 and one or more program modules 306 suitable for running software applications 350. According to an aspect, the system memory 304 includes one or more AMQ filters 140 associated with previously submitted graph queries. The operating system 305, for example, is suitable for controlling the operation of the computing device 300. Furthermore, aspects are practiced in conjunction with a graphics library, other operating systems, or any other application program, and are not limited to any particular application or system. This basic configuration is illustrated in FIG. 3 by those components within a dashed line 308. According to an aspect, the computing device 300 has additional features or functionality. For example, according to an aspect, the computing device 300 includes additional data storage devices (removable and/or non-removable) such as, for example, magnetic disks, optical disks, or tape. Such additional storage is illustrated in FIG. 3 by a removable storage device 309 and a non-removable storage device 310.

As stated above, according to an aspect, a number of program modules and data files are stored in the system memory 304. While executing on the processing unit 302, the program modules 306 (e.g., handlers for AMQ Filters 140) perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 300 has one or more input device(s) 312 such as a keyboard, a mouse, a pen, a sound input device, a touch input device, etc. The output device(s) 314 such as a display, speakers, a printer, etc. are also included according to an aspect. The aforementioned devices are examples and others may be used. According to an aspect, the computing device 300 includes one or more communication connections 316 allowing communications with other computing devices 318. Examples of suitable communication connections 316 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 304, the removable storage device 309, and the non-removable storage device 310 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. According to an aspect, any such computer storage media is part of the computing device 300. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIG. 4 illustrates one example of the architecture of a system for improving computation efficiency in monitoring changes to a relationship graph as described above. Content developed, interacted with, or edited in association with the AMQ filters 140 is enabled to be stored in different communication channels or other storage types. For example, various documents may be stored using a directory service 422, a web portal 424, a mailbox service 426, an instant messaging store 428, or a social networking site 430. The server 420 is operative to use any of these types of systems or the like for improving computation efficiency in monitoring changes to a relationship graph, as described herein. According to an aspect, a server 420 exposes the AMQ filter 140 to clients 405*a,b,c*. As one example, the server 420 is a web server providing the AMQ filters 140 over the web or another network 440. By way of example, the client computing device is implemented and embodied in a personal computer 405*a*, a tablet computing device 405*b* or a mobile computing device 405*c* (e.g., a smart phone), or other computing device.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for improving computational efficiency in monitoring changes to a relational graph, comprising:
   receiving, from a client device, a graph query at a graph server hosting the relational graph;
   running the graph query to span the relational graph to produce a view of the relational graph;
   recording identities of nodes spanned by the graph query in a membership set associated with the graph query;
   receiving, at the graph server, graph changes affecting the relational graph;
   parsing the received graph changes to determine nodes that have changed, each node having an individual identifier;
   determining, based on an individual identifier, whether a given node is recorded in the membership set;
   in response to determining that the given node is recorded in the membership set:
     rerunning the graph query to span the relational graph and produce a new view;
     determining whether the new view is equivalent to the view; and
     in response to determining that the new view is not equivalent to the view, exposing a change to the relational graph to the client device by transmitting the new view to the client device.

2. The method of claim 1, further comprising:
   wherein the identities of nodes spanned by the graph query are recorded in the membership set associated with the graph query comprises in an Approximate Membership Query (AMQ) filter, which comprises:
     initializing a membership array of the AMQ filter, the membership array comprising a plurality of bits, wherein each bit is set to a first state;
     receiving the identifiers for the nodes spanned by the graph query;
     hashing the identifiers to produce positional values for each of the identifiers; and
     recording the nodes in the membership array by setting a bit of the plurality of bits positioned in the membership array at each of the positional values to a second state;
   wherein determining whether the given node is recorded in the membership set includes querying the AMQ filter with the given node, which comprises:
     receiving a given identifier for the given node;
     hashing the given identifier to produce candidate positions for the given node in the membership array; and
     determining a state to which each bit at the candidate positions in the membership array is set; and
     in response to determining that each bit at the candidate positions in the membership array is set to the second state, probabilistically determining that the given node is recorded in the membership set.

3. The method of claim 2 further comprising:
   in response to determining that at least one bit at the candidate positions in the membership array is set to the first state, returning a negative response to querying the AMQ filter and not exposing the change to the client device.

4. The method of claim 1, wherein the change to the relational graph affects multiples nodes, the multiple nodes including the given node.

5. The method of claim 1, further comprising:
   receiving an index structure of the view; and
   recording the index structure in the membership set.

6. The method of claim 5, wherein the index structure comprises identifiers of the nodes spanned by the graph query in a flattened tree structure.

7. The method of claim 1, wherein exposing the change to the client device includes transmitting a change notification to the client device.

8. The method of claim 1, wherein exposing the change to the client device includes transmitting a notification to the client device that the new view is available.

9. The method of claim 1, wherein the nodes spanned by the graph query include nodes that are part of the view and nodes that are connected by an edge that is part of the view.

10. The method of claim 1, further comprising:
    in response to determining that the given node is recorded in the membership set, but prior to rerunning the graph query to span the relational graph and produce the new view, determining whether rerun approval rules are satisfied;
    in response to determining that the rerun approval rules are satisfied, proceeding to rerun the graph query; and
    in response to determining that the rerun approval rules are not satisfied, preventing the graph query from being rerun.

11. The method of claim 10, wherein the rerun approval rules include:
    a threshold number of changed nodes;

a rule to ignore the change unless an index structure of the view has also changed; and
a minimum time between updates to the view.

12. A system for improving computational efficiency in monitoring changes to a relational graph, comprising:
a processor; and
a memory storage device, including instructions that when executed are operable to:
maintain a membership array;
receive a member node identifier and record the member node identifier in the membership array;
receive a candidate node identifier;
in response to determining that the candidate node identifier is recorded in the membership array:
run a graph query to produce a view of the relational graph;
compare the view to a prior view of the relational graph produced by the graph query; and
in response to the view and the prior view not matching, expose the change to the relational graph to a client by transmitting the view to the client.

13. The system of claim 12, wherein the member node identifier is received in response to the graph query being run and is associated with a node in the relational graph that is spanned by the graph query.

14. The system of claim 12, wherein the candidate node identifier is included in a change stream received in response to the change affecting the relational graph.

15. The system of claim 12, wherein the system is operable to determine whether the query is affected by the change to the relational graph by comparing a first index structure against a second index structure, wherein the first index structure is a tree structure of nodes included in the prior view, and wherein the second index structure is a tree structure of nodes included in the view;
in response to the first index structure being equivalent to the second index structure, determine that the query is unaffected by the change; and
in response to the first index structure not being equivalent to the second index structure, determine that the query is affected by the change.

16. The system of claim 12, wherein to expose the change to the relational graph to the client the system is further operable to:
transmit a change notification to a client device associated with the client;
receive a request for the view from the client device in response to the change notification; and
transmit the view to the client device in response to receiving the request.

17. The system of claim 12, wherein the system is further operable to:
provide one or more hash functions, each of the one or more hash functions operable to output a position in the membership array;
wherein the membership array includes an ordered plurality of bits initialized at a first state;
wherein to record the member node identifier in the membership array, the system is further operable to:
hash the member node identifier with the one or more hash functions to produce one or more member positions; and
set one or more bits of the ordered plurality of bits, at the one or more member positions, to a second state; and wherein to determine whether the candidate node identifier is recorded in the membership array, the system is further operable to:
hash the candidate node identifier with the one or more hash functions to produce one or more candidate positions;
determine whether every bit at the candidate positions in the membership array is set to the second state; and
in response to determining that every bit at the candidate positions in the membership array is set to the second state, determining that the candidate node identifier is recorded in the membership array.

18. A computer readable storage device including instructions for improving computational efficiency in monitoring changes to a relational graph, comprising:
receiving, from a client device, a graph query at a graph server hosting the relational graph;
running the graph query to span the relational graph to produce a view of the relational graph;
associating an Approximate Membership Query (AMQ) filter with the graph query, including:
initializing a membership array comprising a plurality of bits, wherein each bit is set to a first state;
receiving identifiers for nodes spanned by the graph query;
hashing the identifiers to produce positional values for each of the identifiers, wherein the positional values each identify a bit at a position in the membership array; and
recording the nodes in the membership array by setting one or more bits of the plurality of bits to a second state, wherein the one or more bits set to the second state correspond to the positional values;
receiving, at the graph server, graph changes affecting the relational graph, the graph changes including a given node that has been changed;
querying the AMQ filter for the given node, including:
receiving a given identifier for the given node;
hashing the given identifier to produce candidate positions for the given node in the membership array; and
determining a state to which each bit at the candidate positions in the membership array is set; and
in response to determining that any bit at the candidate positions in the membership array is set to the first state, preventing the graph query from being rerun.

19. The computer readable storage device of claim 18, wherein the instructions further comprise:
in response to determining that every bit at the candidate positions in the membership array is set to the first state, determining whether rerun approval rules are satisfied; and
in response to determining that the rerun approval rules are not satisfied, preventing the graph query from being rerun.

20. The computer readable storage device of claim 19, wherein the instructions further comprise:
in response to determining that the rerun approval rules are satisfied:
rerunning the graph query to span the relational graph and produce a new view;
determining whether the new view is equivalent to the view; and in response to determining that the new view is not equivalent to the view, exposing a change to the relational graph to the client device.

* * * * *